(12) United States Patent
Hagio et al.

(10) Patent No.: US 11,975,454 B2
(45) Date of Patent: May 7, 2024

(54) PROGRAM GENERATION DEVICE AND NON-TRANSITORY COMPUTER-READABLE STORAGE MEDIUM STORING PROGRAM

(71) Applicant: SEIKO EPSON CORPORATION, Tokyo (JP)

(72) Inventors: Masaaki Hagio, Matsumoto (JP); Akifumi Hayashi, Nagano (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/070,504

(22) Filed: Nov. 29, 2022

(65) Prior Publication Data
US 2023/0166401 A1 Jun. 1, 2023

(30) Foreign Application Priority Data
Nov. 30, 2021 (JP) .................. 2021-194023

(51) Int. Cl.
*G06F 17/00* (2019.01)
*B25J 9/16* (2006.01)
(Continued)

(52) U.S. Cl.
CPC .......... *B25J 9/1661* (2013.01); *G06F 3/0486* (2013.01); *G06F 40/166* (2020.01)

(58) Field of Classification Search
CPC ..... B25J 9/1661; B25J 9/1656; G06F 3/0486; G06F 40/166; G05B 2219/23291;
(Continued)

(56) References Cited

U.S. PATENT DOCUMENTS

| | | | |
|---|---|---|---|
| 11,518,032 B2 * | 12/2022 | Hirabayashi | ........... B25J 13/089 |
| 2005/0102066 A1 * | 5/2005 | Watanabe | ............. B25J 13/003 |
| | | | 704/E15.045 |

(Continued)

FOREIGN PATENT DOCUMENTS

| | | |
|---|---|---|
| EP | 4187336 A1 | 5/2023 |
| JP | H11338681 A | 12/1999 |

(Continued)

OTHER PUBLICATIONS

Ionescu, Tudor B. "Leveraging graphical user interface automation for generic robot programming." Robotics 10.1 (2020): 3 (Year: 2020).*

(Continued)

*Primary Examiner* — Andrew T McIntosh
(74) *Attorney, Agent, or Firm* — Samson G. Yu

(57) ABSTRACT

A program generation device generating an operation program causing a robot to execute a task is provided. The program generation device includes: a display control unit displaying an input screen including an operation block, display area where an operation block relating to an operation of the robot is displayed, an operation block arrangement area where the operation block selected from the operation block display area is arranged to generate the operation program, and a text display area where the operation program is displayed in a text format; and a text editing unit editing the operation program in the text format and displaying the edited operation program in the text display area.

3 Claims, 6 Drawing Sheets

(51) Int. Cl.
*G06F 3/0486* (2013.01)
*G06F 40/166* (2020.01)

(58) Field of Classification Search
CPC .......... G05B 2219/23293; G05B 2219/23389; G05B 19/0426; G05B 2219/40099; G05B 2219/40392
See application file for complete search history.

(56) References Cited

U.S. PATENT DOCUMENTS

| | | | |
|---|---|---|---|
| 2006/0178778 A1 | 8/2006 | Fuhlbrigge et al. | |
| 2010/0325571 A1* | 12/2010 | Kodosky | G06F 9/445 715/772 |
| 2013/0255426 A1* | 10/2013 | Kassow | B25J 9/1671 901/23 |
| 2016/0284232 A1* | 9/2016 | Sisamos | G05B 19/0426 |
| 2017/0320211 A1 | 11/2017 | Akan et al. | |
| 2019/0030715 A1* | 1/2019 | Tarui | B25J 9/163 |
| 2021/0060772 A1 | 3/2021 | Inaba | |
| 2022/0023767 A1* | 1/2022 | Gaba | A63H 30/02 |
| 2022/0076587 A1* | 3/2022 | Murphy | G09B 5/06 |

FOREIGN PATENT DOCUMENTS

| | | |
|---|---|---|
| JP | 2010157155 A | 7/2010 |
| JP | 2021030397 A | 3/2021 |
| WO | 2021153620 A1 | 8/2021 |

OTHER PUBLICATIONS

Weintrop, David, et al. "Blockly goes to work: Block-based programming for industrial robots." 2017 IEEE Blocks and Beyond Workshop (B&B). IEEE, 2017 (Year: 2017).*

Glas, Dylan F., Takayuki Kanda, and Hiroshi Ishiguro. "Human-robot interaction design using interaction composer eight years of lessons learned." 2016 11th ACM/IEEE International Conference on Human-Robot Interaction (HRI). IEEE, 2016 (Year: 2016).*

* cited by examiner

PROGRAM GENERATION DEVICE AND NON-TRANSITORY COMPUTER-READABLE STORAGE MEDIUM STORING PROGRAM

The present application is based on, and claims priority from JP Application Serial Number 2021-194023, filed Nov. 30, 2021, the disclosure of which is hereby incorporated by reference herein in its entirety.

BACKGROUND

1. Technical Field

The present disclosure relates to a program generation device and a non-transitory computer-readable storage medium storing a program.

2. Related Art

For example, JP-A-11-338681 describes a method of generating a robot operation program, using visual programming that connects programs together expressed as geometric shapes and thus constructs a program. Such visual programming makes it easier to generate a robot operation program than the related-art programming based on a text language using characters as units (hereinafter also referred to as "text programming").

However, in JP-A-11-338681, it is difficult to check how the robot operation program generated by visual programming corresponds to text programming. Therefore, it is difficult to support a shift from visual programming to text programming with improvement in user skills.

SUMMARY

According to an aspect of the present disclosure, a program generation device generating an operation program causing a robot to execute a task is provided. The program generation device includes: a display control unit displaying an input screen including an operation block display area where an operation block relating to an operation of the robot is displayed, an operation block arrangement area where the operation block selected from the operation block display area is arranged to generate the operation program, and a text display area where the operation program is displayed in a text format; and a text editing unit editing the operation program in the text format and displaying the edited operation program in the text display area.

According to another aspect of the present disclosure, a non-transitory computer-readable storage medium storing a program for generating an operation program causing a robot to execute a task is provided. The program includes: displaying an input screen including an operation block display area where an operation block relating to an operation of the robot is displayed, an operation block arrangement area where the operation block selected from the operation block display area is arranged to generate the operation program, and a text display area where the operation program is displayed in a text format; and editing the operation program in the text format and displaying the edited operation program in the text display area.

DESCRIPTION OF EXEMPLARY EMBODIMENTS

The program generation device and the program according to the present disclosure will now be described in detail, based on a preferred embodiment illustrated in the accompanying drawings.

Figure 1:
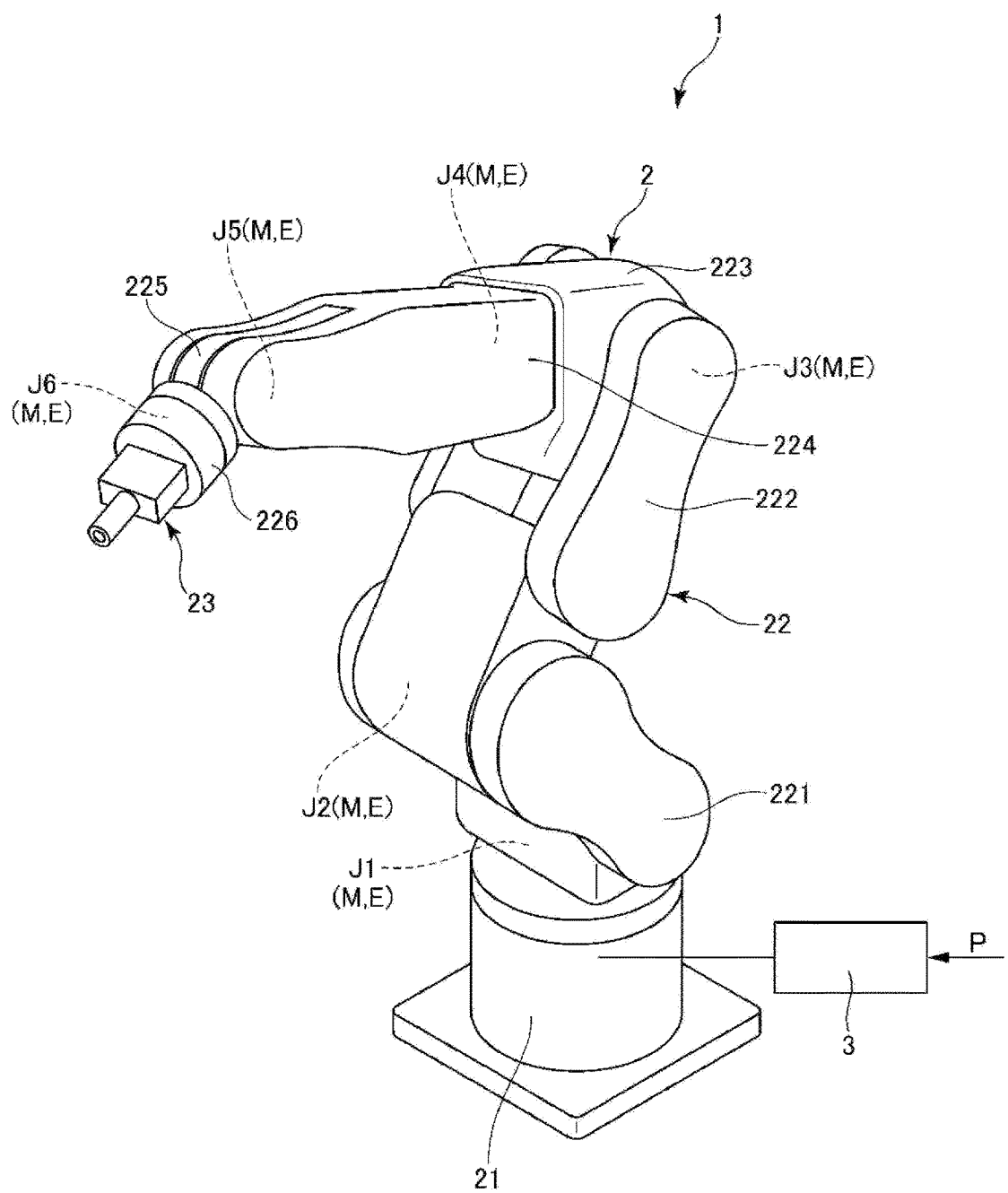
FIG. 1 is a perspective showing an overall configuration of a robot system according to a preferred embodiment.
Figure 2:
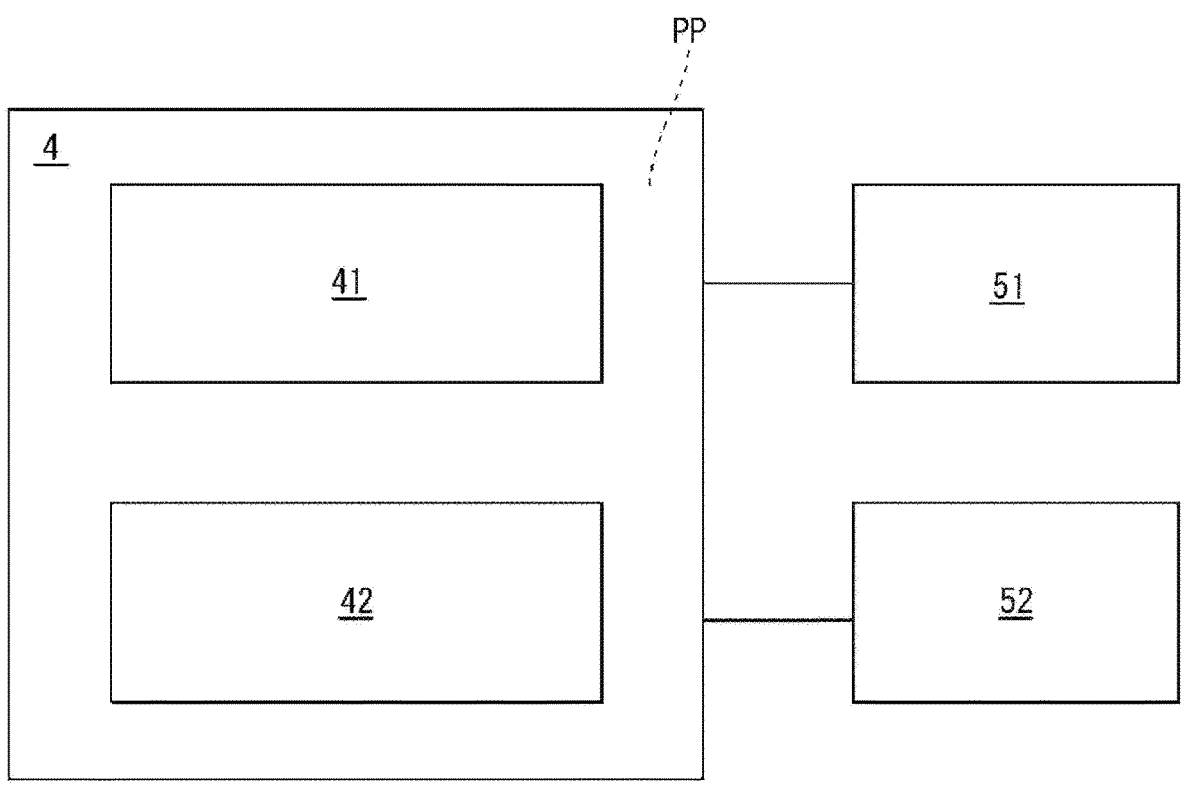
FIG. 2 is, a block diagram showing a program generation device.

FIG. 1 is a perspective view showing an overall configuration of a robot system according to a preferred embodiment. FIG. 2 is a block diagram showing a program generation device. FIGS. 3 to 6 each show an example of an input screen displayed by the program generation device.

Before the description of a program generation device 4, a robot system 1 driven based on an operation program P generated by the program generation device 4 will be briefly described. The robot system 1 has a robot 2 and a robot control device 3 controlling the driving of the robot 2, based on the operation program P, as shown in FIG. 1.

The robot 2 is a six-axis robot having six drive axes. The robot 2 has a base 21 and a robot arm 22 coupled to the base 21 in a rotationally movable manner. An end effector 23 is attached to a distal end part of the robot arm 22.

The robot arm 22 is a robotic arm formed of a plurality of arms 221, 222, 223, 224, 225, 226 coupled together in a rotationally movable manner and has six joints J1 to J6. Of these, the joints J2, J3, J5 are bending joints and the joints J1, J4, J6 are torsional joints. A motor M and an encoder E are installed in each of the joints J1, J2, J3, J4, J5, J6.

The end effector 23 is coupled to the arm 226. The end effector 23 is attachable to and removable from the arm 226. As the end effector 23, an end effector suitable for the task to be executed by the robot 2 can be selected and attached.

The robot 2 has been described above. However, the configuration of the robot 2 is not particularly limited. For example, the robot 2 may be a SCARA (horizontal articulated robot), a dual-arm robot, or the like. The robot 2 may also be fixed to a floor or the like and thus immovable or may be fixed to a moving device such as an automatic guided vehicle (AGV) and thus movable.

The robot control device 3 controls the driving of the robot system 1, based on the operation program P automatically generated by the program generation device 4.

The robot control device 3 is formed of a computer, for example, and has a processor processing information, a memory communicatively coupled to the processor, and an external interface coupling to an external device. Various programs executable by the processor are saved in the memory. The processor can read and execute the various programs or the like stored in the memory.

The robot system 1 has been briefly described above. The program generation device 4 generating the operation program P will now be described.

The program generation device 4 is formed of a computer or a teach pendant, for example, and has a processor processing information, a memory communicatively coupled to the processor, and an external interface coupling to an external device. A program PP of various kinds executable by the processor is saved in the memory. The processor can read and execute the program PP. The program PP is a program for generating the operation program P, Hardware with the program PP installed therein serves as the program generation device 4.

As shown in FIG. 2, a monitor 51 as a display device and an input device 52 such as a keyboard or a mouse are coupled to the program generation device 4. The program generation device 4 has a display control unit 41 causing the monitor 51 to display an input screen 6, and a text editing unit 42 enhancing the readability of the input screen 6.

Figure 3:
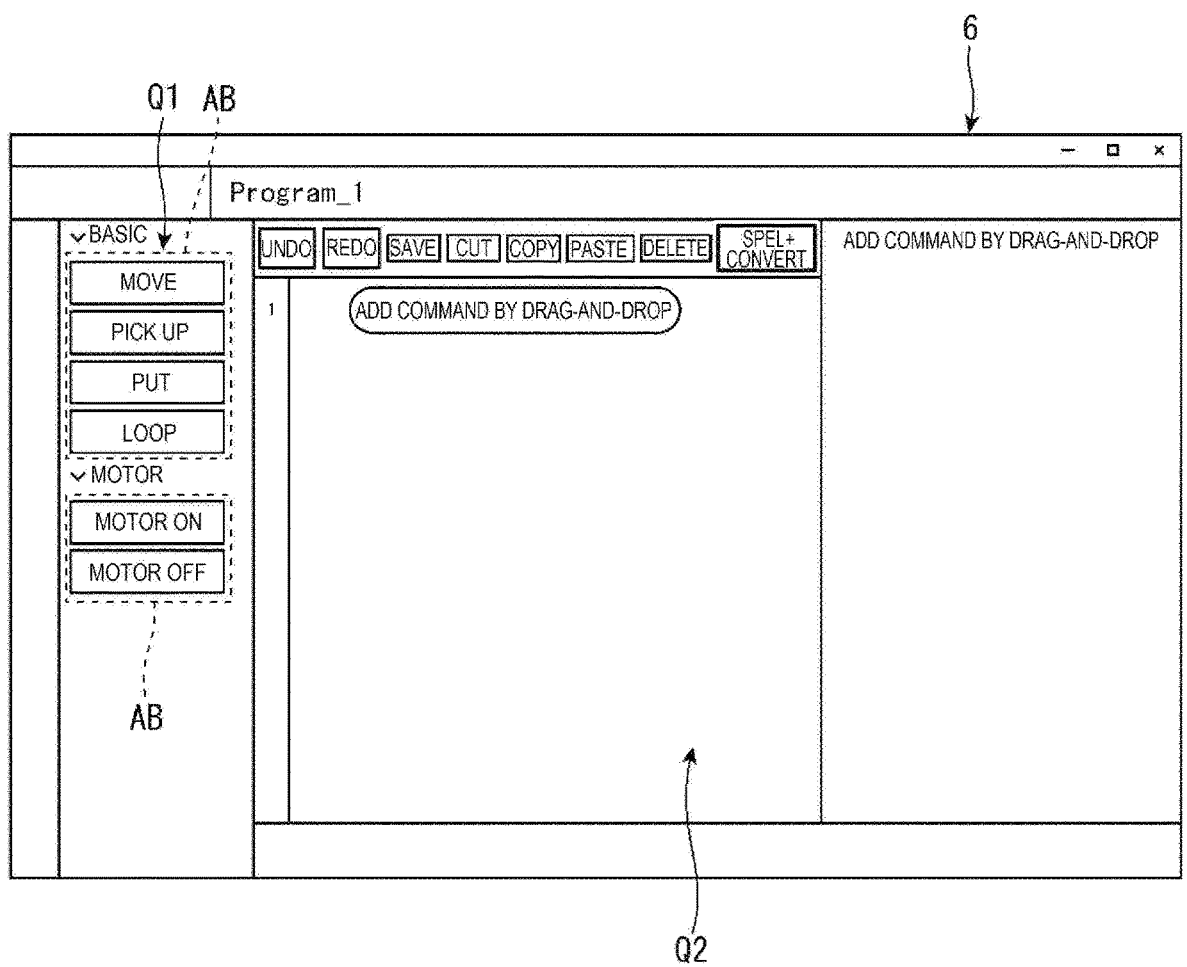
FIG. 3 shows an example of an input screen displayed by the program generation device.

As the program PP starts, the display control unit 41 displays the input screen 6 (GUI or graphic user interface) shown in FIG. 3. The input screen 6 includes an operation block display area Q1 where an operation block AB relating to an operation of the robot 2 is displayed, and an operation block arrangement area Q2 for executing visual programming, using the operation block AB.

In the operation block display area Q1, a plurality of the operation blocks AB are displayed. In the illustrated example, the operation blocks AB are broadly divided into two sections, that is, "basic operation" and "motor". The basic operation includes a total of four operation blocks AB, that is, "move", "pick up", "put", and "loop". The "motor" includes a total of two operation blocks AB, that is, "motor ON" and "motor OFF". However, the contents and number of operation blocks AB are not particularly limited and can be suitably set according to the configuration of the robot 2, the content of the operation program to be generated, and the like.

Figure 4:
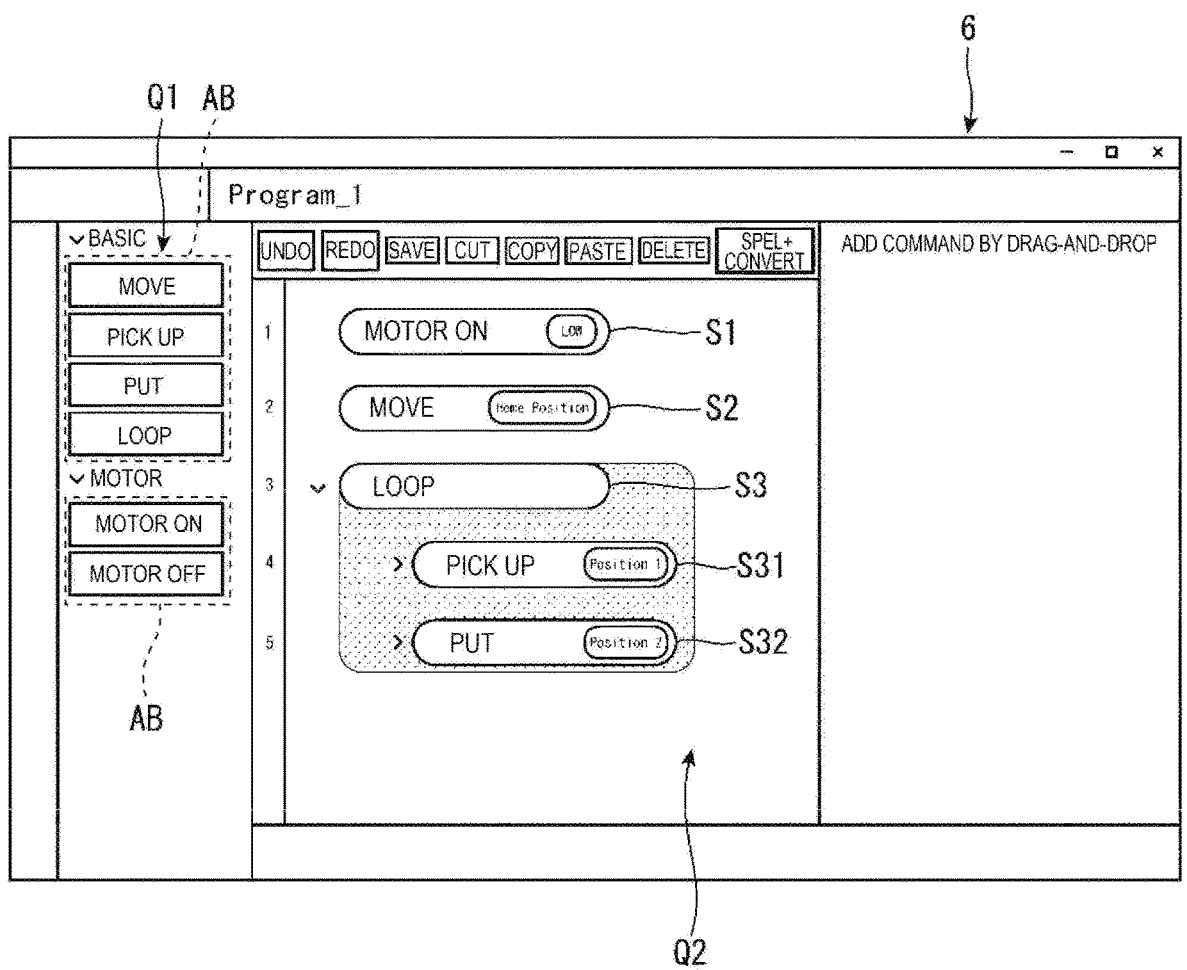
FIG. 4 shows an example of the input screen displayed by the program generation device.

As shown in FIG. 4, the user selects any operation blocks AB from the operation block display area Q1, then sequentially arranges the selected operation blocks AB in the operation block arrangement area Q2, and thus can execute visual programming. The selection of the operation blocks AB and the arrangement of the selected operation blocks AB in the operation block arrangement area Q2 can be executed, for example, by a drag-and-drop of the mouse. Particularly, since the operation block display area Q1 and the operation block arrangement area Q2 are displayed on the same screen and laid side by side, a drag-and-drop can be performed more easily. In the illustrated example, "motor ON" is selected as step S1, "move" is selected as step S2, and "loop" is selected as step S3. In the "loop" of step S3, "pick up" is selected as "step S31 and "put" is selected as step S32.

Figure 5:
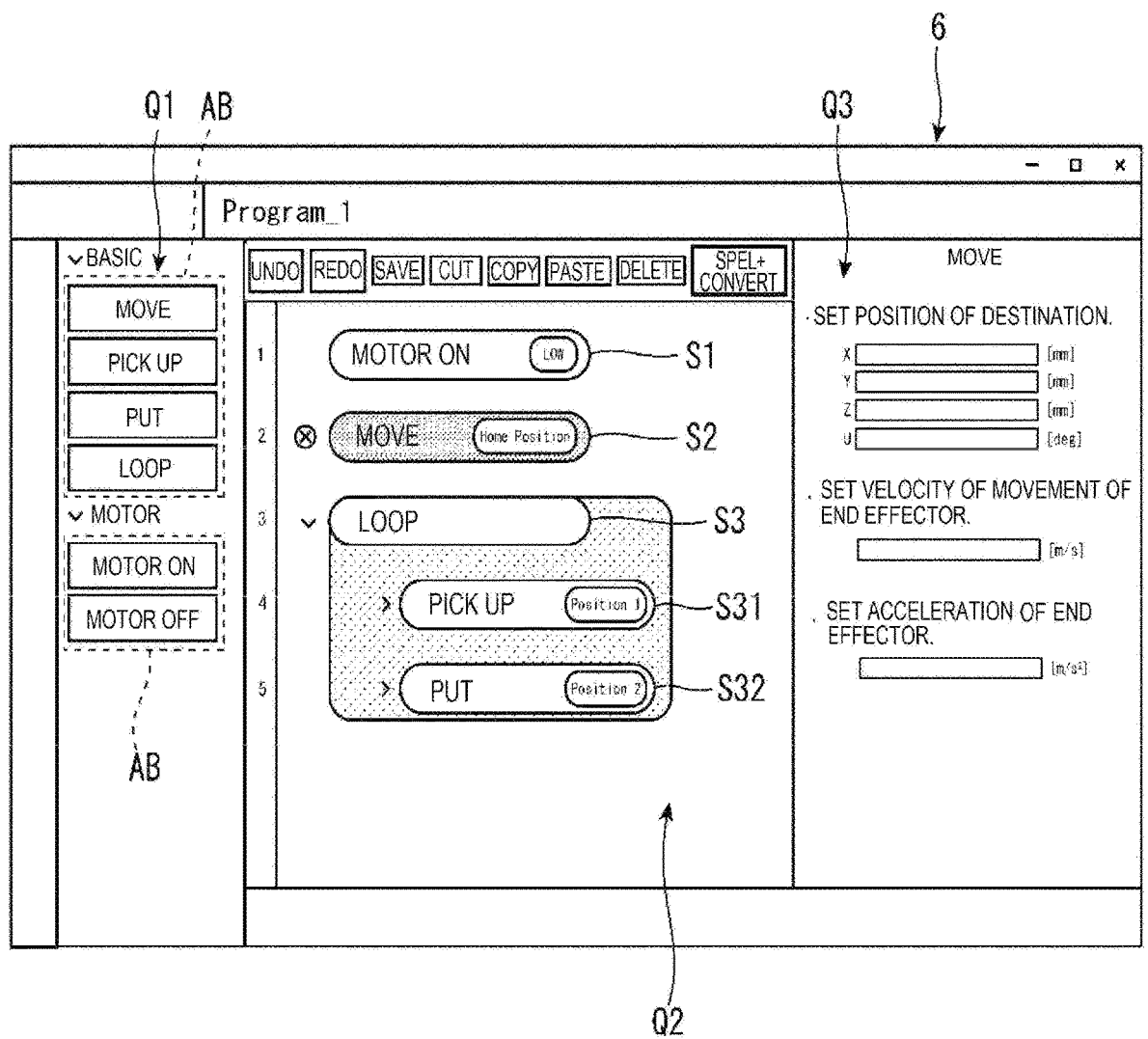
FIG. 5 shows an example of the input screen displayed by the program generation device.

Selecting an operation block in the operation block arrangement area Q2 enables detailed settings of the selected operation block AB. For example, as shown in FIG. 5, when the operation block AB of "move" is selected, a detailed settings area Q3 is displayed to the right of the operation block arrangement area. Q2 and the coordinates of a target position, the velocity of movement (maximum velocity) and the acceleration of the end effector 23, or the like, can be set in the detailed settings area Q3, The same applies to the other operation blocks AB. The above operation generates an operation program for first driving the motor with a low output, then moving to a Home Position, then moving to Position 1 to pick up a target object, then putting the target object at Position 2, and subsequently repeating the operation of moving to Position 1 to pick up a target object and the operation of moving to Position 2 to put the target object. Such visual programming makes it easier to generate the operation program P than text programming.

As for the operation block AB for which the setting is not completed, a warning by a "x" symbol or the like is displayed to the left of the operation block AB, as shown in FIG. 5, thus notifying the user. This can effectively restrain a situation where an operation program cannot be generated due to entry missing. Also, the user can easily learn the operation block AB that is not entered, and therefore generate visual programming easier.

Figure 6:
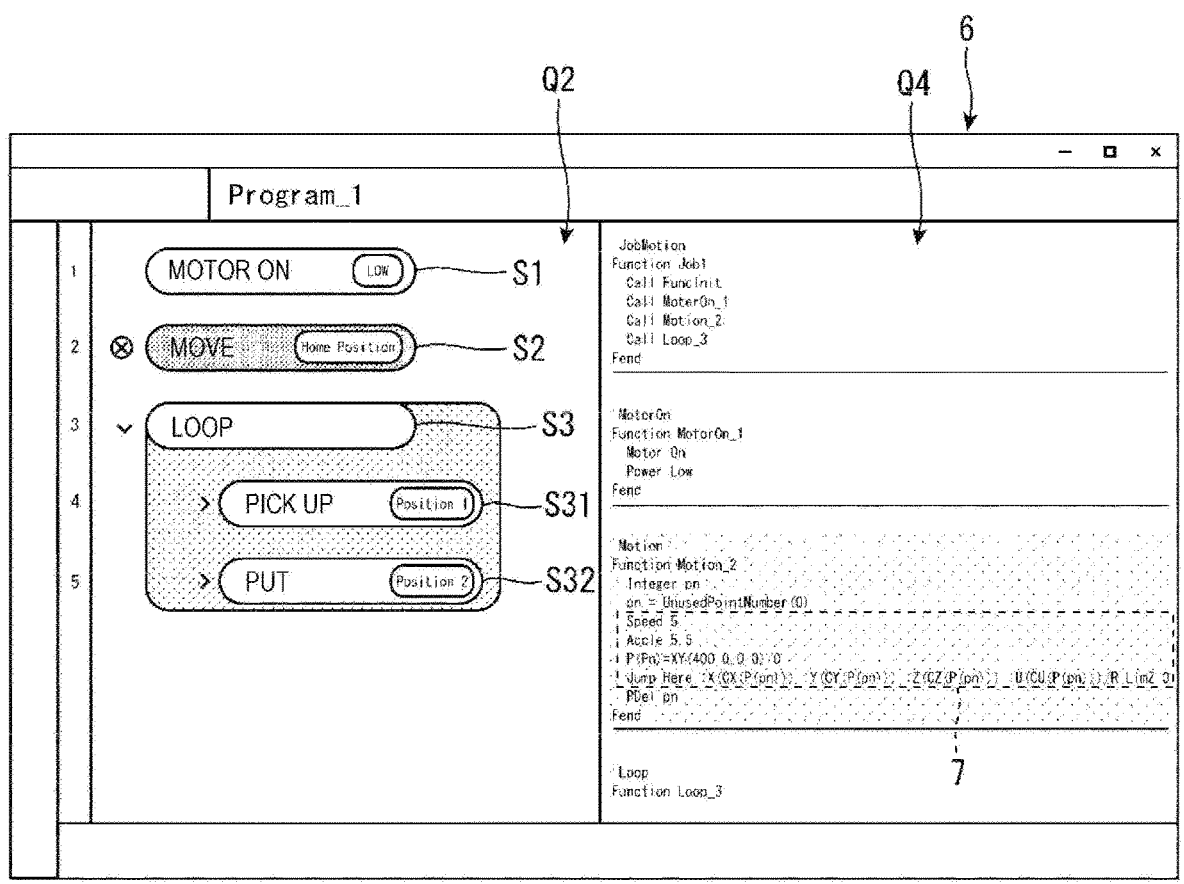
FIG. 6 shows an example of the input screen displayed by the program generation device.

After visual programming in the operation block arrangement area Q2 is completed, the user selects "SPEL+CONVERT" located above the operation block arrangement area Q2. When "SPEL+CONVERT" is selected, the display control unit 41 hides the operation block display area Q1 and displays a text display area Q4 to the right of the operation block arrangement area Q2, as shown in FIG. 6. Then, text data of the operation program is displayed in the text display area Q4. That is, the operation program is displayed in a text format. Thus, a state where the visual program and the text program are juxtaposed on one screen is created, and these programs can be easily compared with each other. Therefore, for example, how the operation block AB of "move" is described in the text program, or the like, can be checked and an excellent learning effect is achieved.

Recently, the use of visual programming is becoming widespread because of its ease of programming, which enables anyone to easily move a robot. However, in visual programming, the range of operations to be executed by the robot is narrower than in text programming, due to limitations on functions in order to implement a simple user interface or the like. Therefore, many users shift from visual programming to text programming with improvement in user skills, and in this shift, need to learn rules of text programming from scratch.

Thus, when a visual program and a text program are displayed side by side on the same screen so that these programs can be compared with each other, as described above, the user can learn a description method for describing a visual program constructed by the user himself/herself as a text program and an effective learning effect can be achieved.

The display control unit 41 has been described above. The text editing unit 42 will now be described. The text editing unit 42 has a function of editing the text program displayed in the text display area Q4 and displaying the edited text program. As described above, the display control unit 41 displays the visual program and the text program side by side. Therefore, these programs can be easily compared with each other and an excellent learning effect, is achieved. However, depending on the skills of the user, it may be insufficient to simply display the text program as it is, in order for the user to deepen the understanding of the text program. The phrase "display the text program as it is" in this case means displaying a description to be translated into a machine language, as it is. Thus, the text editing unit 42 edits the text program and displays the edited text program in the text display area Q4, in order to make it easier to compare the visual program with the text program and in order for the user to deepen the understanding of the text program further.

The text editing unit 42 displays a description that assists in understanding the text program. Such a description is not particularly limited but may be, for example, a description partitioned corresponding to each operation block, as shown in FIG. 6. In the configuration shown in FIG. 6, descriptions corresponding to individual operation blocks are spaced apart from each other by sufficient lines and also partitioned by a horizontal line. Thus, what range of description corresponds to which operation block AB is clarified and the readability of the text program is enhanced. Therefore, an effective learning effect can be achieved and a shift from visual programming to text programming can be supported.

Also, for example, a heading may be displayed at the beginning of the description corresponding to each operation block AB, as shown in FIG. 6. In the configuration shown in FIG. 6, for example, for the description corresponding to the operation block AB of "move", "Motion" is equivalent to the heading. Thus, which description corresponds to which operation block AB is clarified and the readability of the text program is enhanced. Therefore, an effective learning effect can be achieved and a shift from visual programming to text programming can be supported.

When an operation block AB in the operation block arrangement area Q2 is selected, the text editing unit 42 displays the description corresponding to the selected operation block AB in an emphasized form, as shown in FIG. 6. In the illustrated example, the operation block AB of "move" is selected and the corresponding description is highlighted as the emphasized form of display. Thus, which description corresponds to which operation block AB is clarified and the readability of the text program is enhanced. Therefore, an effective learning effect can be achieved and a shift from visual programming to text programming can be supported. The method for displaying in an emphasized form is not particularly limited and may be, for example, displaying in bold characters, changing the color of characters, removing the other descriptions, lightening the color of characters, or the like.

Also, the text editing unit 42 successively shows parameters 7 relating to movement, for each operation block AB, as shown in FIG. 6. For example, the description corresponding to the operation block AB of "move" includes the velocity, acceleration, and position of the end effector 23 as the parameters 7 relating to movement. As the parameters 7 relating to movement are successively shown in this way, the readability of the text program is enhanced and an effective learning effect can be achieved. Therefore, a shift from visual programming to text programming can be supported. The parameters 7 relating to movement are not limited to the velocity, acceleration, and position.

The text editing unit 42 has been described above. However, the editing performed by the text editing unit 42 is not particularly limited. For example, a description giving the user a piece of advice for text programming such as "Try to describe this in such and such a way" may be displayed.

Since the driving of the robot 2 cannot be controlled with the text program as it is, the text program needs to be translated into a machine language suitable for the robot 2. At this point, the content edited by the text editing unit 42 is not taken into account. That is, what is actually translated into the machine language is not the content described in the text display area Q4 but the content of the visual program described in the text format. Thus, the translation into the machine language becomes easier.

The editing performed by the text editing unit 42 may be performed within a range that does not affect the translation of the text program into the machine language. Thus, the operation program edited by the text editing unit 42 and described in the text format can be copied as it is and used as an operation program for operating other robots.

The program generation device 4 and the program PP have been described above. Such a program generation device 4 is a program generation device generating an operation program causing the robot 2 to execute a task. The program generation device 4 has: the display control unit 41 displaying the input screen 6 including the operation block display area Q1, where the operation blocks AB relating to an operation of the robot 2 are displayed, the operation block arrangement area Q2, where the operation blocks AB selected from the operation block display area Q1 are arranged to generate an operation program, and the text display area Q4, where the operation program is displayed in a text format; and the text editing unit 42 editing the operation program in the text format and displaying the edited operation program in the text display area Q4. Such a configuration enhances the readability of the operation program in the text format. Therefore, an effective learning effect can be achieved and a shift from visual programming to text programming can be supported.

As described above, the text editing unit 42 displays, as the editing, a description that assists in understanding the operation program displayed in the text format. Thus, the readability of the operation program in the text format is enhanced. Therefore, an effective learning effect can be achieved and a shift from visual programming to text programming can be supported.

Also, as described above, the text editing unit 42 displays a heading at the beginning of the description corresponding to each operation block AB. Thus, which description corresponds to which operation block AB is clarified and the readability of the operation program in the text format is enhanced. Therefore, an effective learning effect can be achieved and a shift from visual programming to text programming can be supported.

Also as described above, when an operation block AB in the operation block arrangement area Q2 is selected, the text editing unit 42 displays the description corresponding to the selected operation block AB in an emphasized form. Thus, which description corresponds to which operation block AB is clarified and the readability of the text program is enhanced. Therefore, an effective learning effect can be achieved and a shift from visual programming to text programming can be supported.

Also, as described above, the text editing unit 42 successively shows the parameters 7 relating to movement, for each operation block AB. Thus, the readability of the text program is enhanced. Therefore, an effective learning effect can be achieved and a shift from visual programming to text programming can be supported.

Also, as described above, the parameters 7 relating movement include a velocity, an acceleration, and a position. Thus, the description of the text program becomes easier to understand. Therefore, an effective learning effect can be achieved and a shift from visual programming to text programming can be supported.

Also, as described above, the program PP is a program for generating an operation program causing the robot 2 to execute a task. The program PP includes: displaying the input screen 6 including the operation block display area Q1, where the operation blocks AB relating to an operation of the robot 2 are displayed, the operation block arrangement area Q2, where the operation blocks AB selected from the operation block display area Q1 are arranged to generate an operation program, and the text display area Q4, where the operation program is displayed in a text format; and editing the operation program in the text format and displaying the edited operation program in the text display area Q4. Such a configuration enhances the readability of the operation program in the text format. Therefore, an effective learning effect can be achieved and a shift from visual programming to text programming can be supported.

The program generation device and the program according to the present disclosure have been described above, based on the illustrated embodiment. However, the present disclosure is not limited to this embodiment. The configuration of each part can be replaced with any configuration having a similar function. Also, any other component may be added to the present disclosure.

What is claimed is:

1. A program generation device generating an operation program causing a robot to execute a task, the program generation device comprising:
    a display control unit displaying an input screen including an operation block display area where an operation block relating to an operation of the robot is displayed, an operation block arrangement area where the operation block selected from the operation block display area is arranged to generate the operation program, and a text display area where the operation program is displayed in a text format; and
    a text editing unit editing the operation program in the text format and displaying the edited operation program in the text display area,
    wherein the text editing unit displays, as the editing, descriptions that assist in understanding the operation program displayed in the text format, and the text editing unit successively shows a parameter relating to movement, for each operation block, the parameter relating movement includes a velocity, an acceleration, and a position,
    the descriptions corresponding to individual operation blocks are spaced apart from each other by sufficient lines and also partitioned by a horizontal line.

2. The program generation device according to claim 1, wherein
    the text editing unit displays a heading at a beginning of a description corresponding to each operation block.

3. A non-transitory computer-readable storage medium storing a program for generating an operation program causing a robot to execute a task, the program comprising:
    displaying an input screen including an operation block display area where an operation block relating to an operation of the robot is displayed, an operation block arrangement area where the operation block selected from the operation block display area is arranged to generate the operation program, and a text display area where the operation program is displayed in a text format; and
    editing the operation program in the text format and displaying the edited operation program in the text display area,
    displaying, as the editing, descriptions that assist in understanding the operation program displayed in the text format, and successively shows a parameter relating to movement, for each operation block, the parameter relating movement includes a velocity, an acceleration, and a position,
    wherein the descriptions corresponding to individual operation blocks are spaced apart from each other by sufficient lines and also partitioned by a horizontal line.

* * * * *